Figure 1:
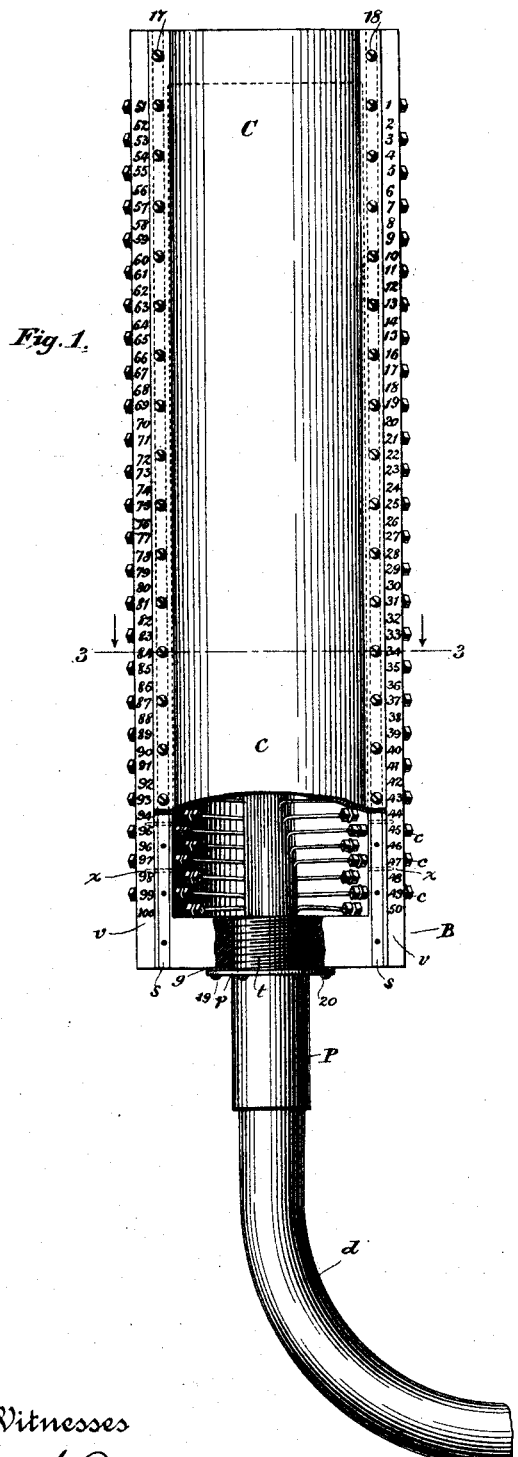

(No Model.)  
2 Sheets—Sheet 1.

J. C. REILLY.
CABLE TERMINAL.

No. 429,815.  
Patented June 10, 1890.

Witnesses  
Geo. W. Breck.  
Henry W. Lloyd.

Inventor  
John C. Reilly  
By his Attorney  
Wm B. Vansize (No Model.) 2 Sheets—Sheet 2.

J. C. REILLY.
CABLE TERMINAL.

No. 429,815. Patented June 10, 1890.

Witnesses
Geo. W. Breck.
Henry W. Lloyd.

Inventor
John C. Reilly
By his Attorney

UNITED STATES PATENT OFFICE.

JOHN C. REILLY, OF BROOKLYN, NEW YORK.

CABLE-TERMINAL.

SPECIFICATION forming part of Letters Patent No. 429,815, dated June 10, 1890.

Application filed November 18, 1889. Serial No. 330,761. (No model.)

*To all whom it may concern:*

Be it known that I, JOHN C. REILLY, a citizen of the United States, and a resident of Brooklyn, in the county of Kings and State of New York, have invented certain new and useful Improvements in Cable-Terminals, of which the following is a specification.

My invention is an improvement in cable-terminals.

The object of my invention is to provide a suitable and effective device for preventing access of air and moisture to the insulated conductors of a sheathed cable, which device at the same time furnishes a means for distributing the several conductors forming the cable and separately connecting them to isolated or independent conductors, respectively. I provide a cylindrical or oval box of insulating material having a longitudinal section thereof removable. I place ribs on the walls to furnish a seat or bearing for connecting-posts. The edges of these ribs are planes beveled at a suitable angle to furnish a surface for bearing or upon which to inscribe the number or designation of each connecting-post and its attached conductor. There is a groove separating adjacent ribs for the purpose of extending the surface and cutting or dividing the continuity of any film of moisture which might otherwise gather and electrically connect two adjacent lines or rows of connecting-posts. The removable section of the cylinder (the cover) is screwed into position, metallic strips being set and fastened into the main section and tapped to receive the screws. This also contributes to the strength of the cylinder. There is a circular orifice to receive a section of pipe in one of the flat ends of the cylinder. This is screwed into position, and a collar formed integral with the pipe-section finds a seat on a gasket and is retained in place by screws or pins. This pipe-section is of greater diameter than the cylindrical covering of the pipe if such sheath is of metal; but if the sheathing is of rubber or some fabric the pipe-section is of less diameter. The core of the cable or the insulated wires pass through the pipe-section into the box or terminal, where the wires are distributed one to each connecting-post. The junction between the cable-covering and the pipe-section is hermetically closed and sealed by the use of either solder or a suitable insulating compound. In either case the pipe-section may be unscrewed from its seat in the terminal if it is found easier or more expeditious than to remove the solder or luting material. Saddles of cast or other suitable metal are screwed to the cylindrical box or terminal, and the extended arms of such saddles are made to conform to the shape of the surface against which the terminal is fixed, whether it be flat or round. The removable section of the cylinder, which for convenience I call the "cover," is screwed into position and rendered air-tight in any suitable way.

The accompanying drawings illustrate my invention.

Figure 2:
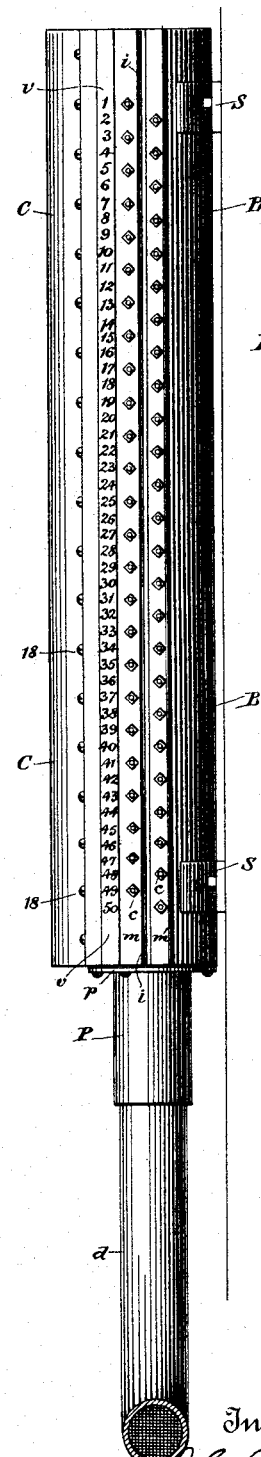
Figure 3:
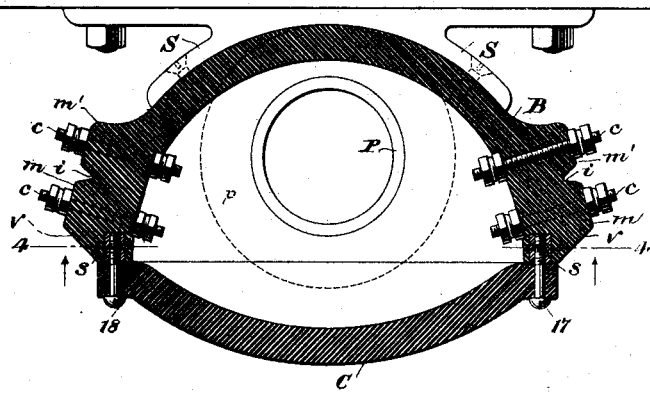
Figure 4:
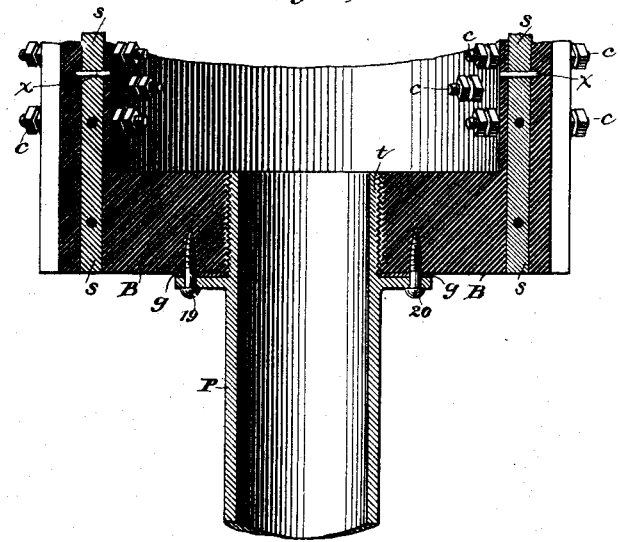

Figure 1 is a face view of the terminal with attached cable, part of the terminal and of the cable being broken away to clearly show the relation of the parts. Fig. 2 is a side view of the terminal in position, showing also the supporting-saddles. Fig. 3 is a cross-section of the terminal on line 3 3, Fig. 1; and Fig. 4 is a sectional view showing the pipe-section and the means for fixing it in position.

In Figs. 1 and 3, B is the box or terminal proper. It is in form approximately semi-cylindrical. A section C or cover is removable. Strips of brass $s$, set into the edges of B, are held by pins $x$ and are tapped to receive the screws 17 and 18, which hold the sections B and C in close contact. The material of the box is some suitable insulating material. I prefer hard rubber, which I cast in a mold. Near the edges of the section B, I form the material into ribs $m\ m'$, separated by a deep groove $i$. This rib formation is to provide a stronger support or seat for rows of screw-cups or connecting-posts which pass through the ribs and are furnished with screw-threaded washers $c\ c$ upon both ends, so that wires may be separately attached to both ends of the connecting-posts, the wires of the cable on the inside and the separated conductors on the outside. The ribs $m\ m$ on both sides, near the edge of B, are beveled to furnish a prominent surface $v$, upon which the numbers or arbitrary designation of each and every connecting-post may be inscribed, as shown in Figs. 1 and 3. The ends of the cylindrical section B are thicker than the other walls of the terminal, as shown in Fig. 4. One end has a circular opening screw-threaded in its interior to receive the screw-threaded end of the pipe-section P. This pipe-section P is of metal, having a collar $p$ integral therewith. The end of pipe-section P is screw-threaded, as at $t$. The pipe-section is screwed into the box-section B until the collar $p$ rests firmly against a gasket $g$, and screws 19 and 20 prevent the pipe-section from becoming loosened in use. The diameter of pipe-section P outside the terminal B is made of a diameter to fit the exterior of the protecting-sheath $d$ of the cable if a lead pipe or the interior of a rubber or other suitable covering as a fabric is used. The core upon entering the terminal has its assembled conductors separated, and the insulated conductors are attached to the series of connecting-posts—one conductor to each post—conductor No. 1 being attached to post No. 1, conductor No. 2 to post No. 2, and so on throughout the series. The cover is then placed in position and screwed down. A suitable water-proof insulating material is used when necessary to make the contact-surfaces air and moisture proof, such as a strip of rubber.

In Fig. 3 the saddle is shown. There are two of these, one for each end of the terminal. Each saddle has arms, one pair of which is made to conform to the shape of the terminal and another pair to the surface upon or against which the terminal is to be fixed or placed. The saddle is screwed to the terminal and to the supporting-surface, as shown. The cylindrical or oval form of the terminal economizes space and adapts itself to the practical requirements better than any other form. It is stronger and more readily sheds water and moisture. By forming the box of insulating material I avoid the condensation of moisture, which, when the temperature changes rapidly, becomes frost and produces an escape or leak liable to interrupt the use of the conductors for telegraphic or telephonic communication, and it is unnecessary to separately insulate each individual connecting-post.

What I claim, and desire to secure by Letters Patent, is—

1. The combination of a cable-terminal, of cast or molded insulating material, in two sections, one or more ribs or strips upon the exterior surface of one section, a series of connecting-posts extending through said ribs, a section of pipe united to a perforated end of said section, a series of insulating-conductors having a sheathing united to said pipe-section, and electrical connections between the connecting-posts and conductors, respectively, substantially as described.

2. The combination of a cable-terminal of hard rubber, in two sections, parallel ribs upon the exterior surface of one section separated from each other by grooves or channels, said ribs having a beveled plane surface for the inscriptions of numbers or letters, a series of connecting-posts extending through said ribs, a section of pipe united to a perforated end of said section, a series of insulated electrical conductors having a suitable protecting-sheathing united to said pipe-section, and electrical connections between the interior terminal of said connecting-posts and said insulated conductors, respectively, substantially as described.

3. A cable-terminal having one or more thickened ribs in which connecting-posts are located, a removable cover, and a section of pipe forming a joint with the cable-sheath, through which the cable-core is introduced, substantially as described.

4. A cable-terminal, of insulating material, in two sections, combined with strips of metal set into the edges of one section to strengthen the terminal and form a bearing for the screws by which the two sections are united, substantially as described.

Signed at the city of New York, in the county of New York and State of New York, this 13th day of November, A. D. 1889.

JOHN C. REILLY.

Witnesses:
DANIEL E. DELAVAN,
WM. B. VANSIZE.